United States Patent
Dumitru et al.

(10) Patent No.: US 11,388,168 B2
(45) Date of Patent: Jul. 12, 2022

(54) DATA GOVERNANCE OPERATIONS IN HIGHLY DISTRIBUTED DATA PLATFORMS

(71) Applicant: EMC IP Holding Company LLC, Hopkinton, MA (US)

(72) Inventors: Aurelian Dumitru, Round Rock, TX (US); Gaurav Chawla, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 271 days.

(21) Appl. No.: 16/785,770

(22) Filed: Feb. 10, 2020

(65) Prior Publication Data
US 2021/0250358 A1    Aug. 12, 2021

(51) Int. Cl.
H04L 9/40 (2022.01)
G06F 16/245 (2019.01)
G06F 16/23 (2019.01)

(52) U.S. Cl.
CPC ........ H04L 63/102 (2013.01); G06F 16/2358 (2019.01); G06F 16/2379 (2019.01); G06F 16/245 (2019.01); H04L 63/1425 (2013.01); H04L 63/20 (2013.01)

(58) Field of Classification Search
CPC ... H04L 63/102; H04L 63/1425; H04L 63/20; G06F 16/2379; G06F 16/245; G06F 16/2358
USPC .......................................................... 726/1
See application file for complete search history.

(56) References Cited

U.S. PATENT DOCUMENTS

| | | | |
|---|---|---|---|
| 2005/0044406 A1* | 2/2005 | Stute | C12Q 2525/143 726/4 |
| 2012/0240185 A1* | 9/2012 | Kapoor | H04L 63/20 726/1 |
| 2014/0310779 A1* | 10/2014 | Lof | G06F 21/10 726/4 |
| 2020/0382510 A1* | 12/2020 | Dunjic | H04L 63/102 |
| 2022/0138343 A1* | 5/2022 | Reineke | G06F 21/6227 726/28 |

OTHER PUBLICATIONS

Nagato et al., 2019 IEEE ICOIN "Distributed Key-Value Storage for Edge Computing and its Explicit Data Distribution Method", pp. 147-152 (Year: 2019).*

(Continued)

*Primary Examiner* — Khalil Naghdali
(74) *Attorney, Agent, or Firm* — Ryan, Mason & Lewis, LLP

(57) ABSTRACT

A method in one embodiment comprises receiving a plurality of requests for data records from a plurality of clients. The data is in a plurality of data systems of a global namespace, and the plurality of data systems are in a plurality of locations. The method also comprises determining whether a given client is allowed access to one or more of the data records based on one or more of a plurality of data access policies, retrieving the data records from at least one of the data systems based on a determination that the given client is allowed access to the data records, and providing the data records to the given client. Retrieving the data records comprises determining a location for the data records, and generating a channel to the location through which the data records are retrieved.

20 Claims, 5 Drawing Sheets

(56) References Cited

OTHER PUBLICATIONS

Chrysafis et al., 2019 arXiv International Conference on Information Networking (ICOIN), "FoundationDB Record Layer: A Multi-Tenant Structured Datastore", pp. 147-152 (Year: 2019).*

Zdnet.com, "Target Confirms Breach: 40 Million Accounts Affected," zdnet.com/article/target-confirms-breach-40-million-accounts-affected/, Dec. 2013, 6 pages.

Zdnet.com, "Target's Data Breach: It Gets Worse," zdnet.com/article/targets-data-breach-it-gets-worse/, Jan. 2014, 3 pages.

Princeton.edu, "Phones Vulnerable to Location Tracking Even When GPS Services Off," princeton.edu/news/2017/11/29/phones-vulnerable-location-tracking-even-when-gps-services, Nov. 29, 2017, 5 pages.

N. Hodge, "Compliance Is Feeling GDPR's Growing Pains," Compliance Week, complianceweek.com/data-privacy/compliance-is-feeling-gdprs-growing-pains/24735.article, Nov. 28, 2018, 5 pages.

Finra, "Technology Based Innovations for Regulatory Compliance ("RegTech") in the Securities Industry," Executive Summary, Sep. 2018, 13 pages.

E. Flitter, "Capital One Data Breach Compromises Data of Over 100 Million," New York Times, nytimes.com/2019/07/29/business/capital-one-data-breach-hacked.html, Jul. 30, 2019, 4 pages.

Wikipedia, "Global Namespace," https://en.wikipedia.org/w/index.php?title=Global_Namespace&oldid=933144349, Dec. 30, 2019, 2 pages.

F5 Networks, Inc. "Global Namespace," https://www.f5.com/services/resources/glossary/global-namespace, Jan. 20, 2020, 2 pages.

Wikipedia, "Node (Computer Science)" https://en.wikipedia.org/w/index.php?title=Node_(computer_science)&oldid=925581250, Nov. 11, 2019, 4 pages.

L. Brandenburg, "What is a Data Dictionary?" https://www.bridging-the-gap.com/data-dictionary/, Feb. 5, 2020, 2 pages.

M. Rouse, "What is Fabric?" https://whatis.techtarget.com/definition/fabric, Jan. 20, 2020, 3 pages.

M. Rouse, "What is Global Namespace?" https://searchstorage.techtarget.com/definition/global-namespace, Jan. 20, 2020, 3 pages.

M. Pfeil, "What is Persistence and Why Does it Matter?" DataStax, https://www.datastax.com/blog/2010/10/what-persistence-and-why-does-it-matter, Oct. 22, 2010, 4 pages.

* cited by examiner

DATA GOVERNANCE OPERATIONS IN HIGHLY DISTRIBUTED DATA PLATFORMS

FIELD

The field relates generally to information processing systems, and more particularly to managing access to data in information processing systems.

BACKGROUND

Managing access to data in highly distributed data platforms spanning multiple geo-locations, multiple public cloud services and multiple data centers is very difficult and prone to unauthorized access. Conventional approaches for data access management utilize access controls associated with a centralized location for the data, such as, for example, a database, file system, object store, etc.

These conventional techniques are not effective when the data leaves the centralized location, for example, in response to data requests made by authorized clients from remote locations. In other words, current data governance solutions are limited to controlling access to data at the locations where the access controls are implemented, and fail to protect the data outside of these locations. In a non-limiting example, sharing patient medical records with medical professionals or financial institutions that are not in a medical insurance provider's network exposes the data to vulnerabilities once the data travels outside of and is no longer able to be controlled by the insurance provider's network.

Current access controls also lack the ability to track private data throughout the multiple transformations that may be part of the lifecycle of the data. Even when the data does not move out of a source database, once the data has gone through several transformations, such as, for example, data structure changes, data reductions, etc., conventional techniques are not able to determine what constitutes private data and put proper protections in place.

SUMMARY

In one embodiment, an apparatus comprises at least one processing platform including a plurality of processing devices. The processing platform is configured to receive a plurality of requests for data records from a plurality of clients, wherein the data records are in a plurality of data systems of a global namespace, and wherein the plurality of data systems are in a plurality of locations. The processing platform is also configured to determine whether a given client of the plurality of clients is allowed access to one or more of the data records based on one or more of a plurality of data access policies, to retrieve one or more of the data records from at least one of the plurality of data systems based on a determination that the given client is allowed access to the one or more of the data records, and to provide the one or more of the data records to the given client. In retrieving the one or more of the data records, the processing platform is configured to determine a location of the plurality of locations for the one or more of the data records, and to generate a channel to the location through which the one or more of the data records are retrieved.

These and other illustrative embodiments include, without limitation, apparatus, systems, methods and computer program products comprising processor-readable storage media.

DETAILED DESCRIPTION

Figure 1:
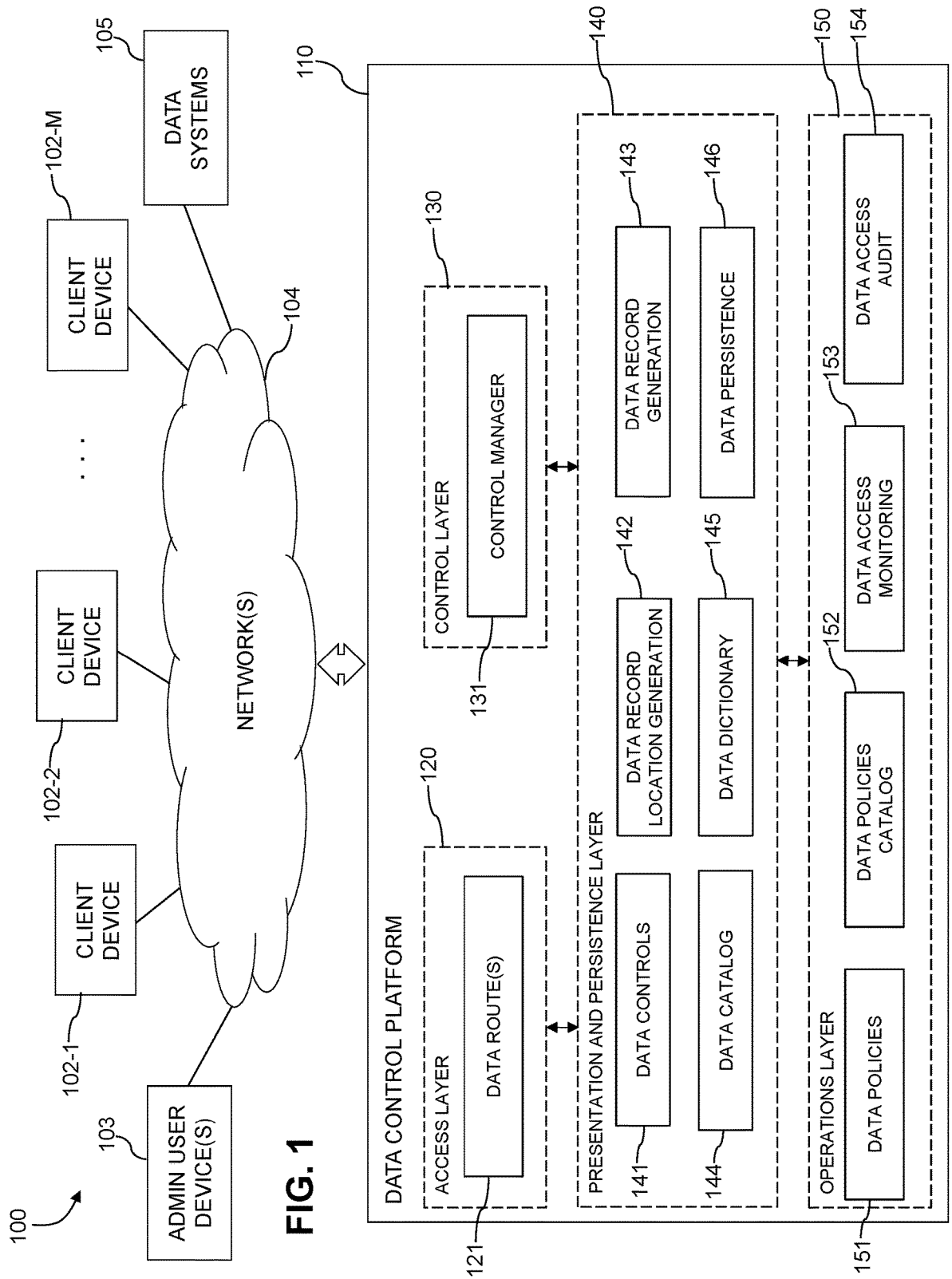
FIG. 1 is a block diagram of an information processing system comprising a data control platform configured for providing data access controls independent of where the data is being stored in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS®), Google Compute Engine® (GCE), and Microsoft Azure® platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "governance" includes a management approach for direction and control of an enterprise, using a combination of management information and hierarchical management control structures.

As used herein "compliance" refers to conformance with requirements, such as, for example, laws, regulations, contracts, strategies and/or policies. Compliance includes identifying applicable requirements, determining the state of compliance, determining risks and cost of non-compliance, determining expenses to achieve compliance and implementing compliance steps.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

FIG. 1 shows an information processing system 100 configured in accordance with an illustrative embodiment. The information processing system 100 comprises client devices 102-1, 102-2, . . . 102-M (collectively "client devices 102"), one or more administrative user devices 103 and a plurality of data systems 105. The client devices 102, administrative user devices 103 and data systems 105 communicate over a network 104 with a data control platform 110.

The client devices 102 and administrative user devices 103 can comprise, for example, desktop, laptop or tablet computers, mobile telephones, Internet of Things (IoT) devices, or other types of processing devices capable of communicating with the data control platform 110 over the network 104. The variable M and other similar index variables herein such as K, L and N are assumed to be arbitrary positive integers greater than or equal to two.

The term "client" or "user" herein is intended to be broadly construed so as to encompass numerous arrangements of human, hardware, software or firmware entities, as well as combinations of such entities. Data control services may be provided for clients or users utilizing one or more machine learning models, although it is to be appreciated that other types of infrastructure arrangements could be used. At least a portion of the available services and functionalities provided by the data control platform 110 in some embodiments may be provided under Function-as-a-Service ("FaaS") and/or Platform-as-a-Service ("PaaS") models, including cloud-based FaaS and PaaS environments.

The data control platform 110 in the present embodiment is assumed to be accessible to the client devices 102, administrative user devices 103 and data systems 105 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The data systems 105 include, for example, highly distributed data platforms in multiple geographic locations, multiple public, private and/or hybrid cloud services, and multiple data centers. As noted herein above, examples of public clouds may include, but are not limited to, AWS®, GCE, and Azure® platforms.

The data control platform 110 includes an access layer 120 comprising one or more data routes 121, and a control layer 130 comprising a control manager 131. The data control platform 110 further includes a presentation and persistence layer 140 including a data controls component 141, a data record location generation component 142, a data record generation component 143, a data catalog 144, a data dictionary 145 and a data persistence component 146. The data control platform 110 also includes an operations layer 150 comprising data policies 151, a data policies catalog 152, a data and access monitoring component 153 and a data access audit component 154. The data control platform 110 in some embodiments may be implemented as part of a cloud infrastructure in the form of a cloud-based system such as an AWS® system. Other examples of cloud-based systems that can be used to provide at least portions of the data control platform 110 and possibly other portions of system 100 include GCE, and Microsoft Azure®.

The data control platform 110, on behalf of respective infrastructure tenants each corresponding to one or more data clients associated with respective ones of the client devices 102, adds access controls to data nodes and data routes 121 in highly distributed data platforms. Data nodes refer to a data structure unit including data, which may link to other nodes. A node can be a process running on a virtual or physical machine or in a container.

According to one or more embodiments, the data control platform 110 is a framework that runs on top of a distributed data platform in which a plurality of data systems 105 in different geographic locations are the sources for the data. Depending on preconfigured policies 151, data controls 141 are implemented in the distributed data platform to grant or to revoke client access to data from one or more of the data systems 105. Additionally, the data access monitoring component 153 monitors authorized and unauthorized access to data, data change history and/or client access profiles, and the data access audit component 154 reports the authorized and unauthorized access to the data, the data change history, and/or the client access profiles to the one or more administrative users 103 responsible for controlling information in an enterprise and/or administering the data control platform 110. According to one or more embodiments, the data controls component 141 also supports a variety of operational tasks including, but not necessarily limited to data replication, data snapshot generation and data replacement.

The access layer 120 serves as the gateway interface for clients (via client devices 102) to connect to the data control platform 110 in order to access data from the one or more of the data systems 105. The access layer comprises one or more data routes 121, which are secure channels used by data clients to access the data and/or request data operations, such as, for example, write operations, data movement and/or data migration.

The control layer 130 serves as the underlying infrastructure for all data-related services and capabilities performed by the data control platform 110. The control layer 130 includes a control manager 131. The control manager 131 manages configurations of data controls generated and/or used by the data controls component 141.

The presentation and persistence layer 140 implements technical capabilities to enable data clients to learn about and access available data records. The presentation and persistence layer 140 also ensures persistence of data. The data controls component 141 uses data access policies 151 to grant and revoke data clients' access to data from the data systems. Data controls are built into the presentation and persistence layer 140 by the data controls component 141, which implements data governance rules that are specific to data clients, data content and data location.

The term "global namespace" as used herein refers to a federation of data systems providing access to data regardless of physical location. A global namespace provides a consolidated view into multiple data systems (including, for example, Network File Systems (NFS), Common Internet File Systems (CIFS), network-attached storage (NAS) systems, structured query language (SQL) systems, unstructured (e.g., NoSQL) systems, graph systems, key-value systems, object systems and/or file systems that are in different physical locations. The global namespace permits access to data by a data client without the data client knowing where the data physically resides. The global namespace aggregates disparate and remote network-based data systems which can be collectively managed.

The data record location generation component 142 generates data record location descriptors (also referred to herein as "data location descriptor" or "DataStoreLocator"). The data record location descriptors follow a naming convention that allows data clients (e.g., data consumers and data producers) to locate data records in a global namespace. According to an embodiment, a data location descriptor is a dot notation for data location identifiers to be used for locating data sets in a global namespace.

According to one or more embodiments, the data location descriptors use a hierarchy from a lowest relevant level to a top level global namespace domain (e.g., Domain Name System (DNS) Fully Qualified Domain Name (FQDN)). For example, a data location descriptor for a sales data store in a production environment deployed in Singapore AWS® by a company named Acme Software, Ltd. may look like:

DATA_LOCATOR=sales.datastores.prod.singapore. aws.acme-software

Using dot notation to locate data sets in a global namespace defines broad and/or granular access controls, compliance policies, and audits. The use of a DataStoreLocator including a data store identifier (DataStoreID) enables the data controls component 141 to make data routing decisions in line with governance policies imposed on data record classes.

The data record generation component 143 generates data record descriptors. The data record descriptors follow a naming scheme for describing characteristics of data records, such as, for example, version, a type, and a schema of respective portions of data, and/or for describing operational requirements of data records, such as, for example, a resilience, a compliance constraint and a performance level of respective portions of data.

According to embodiments, data record descriptors describe various attributes of data records. For example, a data record descriptor identifies the data record with a data record unique ID (ObjID). Data record descriptors also include version information (ObjVer) identifying a version of a data record to track changes to the data record, and construct a history of the data record. On a case by case basis, data clients may request and/or be granted access to specific version(s) of a data record when multiple versions of the data record are available.

Data record descriptors also identify (i) the type of data record (ObjType), such as, for example, JavaScript Object Notation (JSON), binary large object (BLOB), SYSTEM, etc.; (ii) the data schema used for structuring data record's content (ObjSchemaID); and (iii) the version of the data schema used for structuring data record's content (ObjSchemaVer). On a case by case basis, data clients may expect a data record structure to follow a specific version of the data schema, when multiple versions are available.

Data record descriptors may further identify the unique ID of a parent data record (ParentObjID) or the unique ID of a child data record (ChildObjID). These unique IDs are used for establishing static or dynamic parent-child relationships between data records.

According to one or more embodiments, as noted above, a data record descriptor includes a data store identifier (DataStoreID), which identifies a data store where a data record is stored. In an embodiment, all data records have a DataStoreID, even temporary/non-persistent data records. The DataStoreID can identify, for example, a database, a file system, an object store, a data fabric, a data ingest source, or any other type of data system 105. When assigned to a given data store and labeled with the corresponding DataStoreID, a data record is subject to all the data resiliency, persistence, and other operational requirements imposed on that specific data store. As noted above, the use of a DataStoreLocator including a data store identifier (DataStoreID) enables the data controls component 141 to make data routing decisions in line with governance policies imposed on data record classes.

Additional ways to control persistency and other operational requirements of data include the addition of resilience service level agreement (ReslienceSLA) descriptors, regulatory compliance SLA (RegCompSLA) descriptors and/or performance SLA (PerfSLA) descriptors to the data record descriptors.

A resilience SLA descriptor includes various attributes that define a data record's resilience parameters, which can be in addition to the resilience parameters of the data store to which the data record may be subject. The resilience parameters may include, but are not necessarily limited to, data record lifespan and/or data record durability (e.g., 2 or more copies). For example, certain types of data that generally cannot be lost, like medical data, may be assigned higher resilience requirements (e.g., more copies, longer lifespan, more safeguards) than other types of data.

A regulatory compliance SLA descriptor includes attributes that define regulatory compliance constraints that are imposed on a data record. The constraints may originate from, for example, organizational or government standards, regulations and/or laws. Such standards, regulations or laws can include, for example, General Data Protection Regulation (GDPR), the Health Insurance Portability and Accountability Act (HIPAA), Payment Card Industry Data Security Standard (PCI DSS) or other customer privacy standards, regulations and/or laws.

A performance SLA descriptor includes attributes that define a performance level (e.g. gold, silver or bronze) or performance requirements from an SLA. Some performance requirements include, for example, data replication speed (e.g., data record replicated in 15 ms or less) and data delivery constraints (e.g., a data record needs to be delivered by an underlying service and/or infrastructure).

Data record descriptors may further include custom attributes (OEM descriptors) that are defined by, for example, applications, data owners, data clients, administrative users, or other entities. Data record descriptors are saved in data catalogs 144 and are presented to data clients via one or more client devices 102. A data catalog 144 comprises a service that allows data clients to search for, locate, store and request data records. The data catalog 144 is a data management tool configured to assist data clients with finding and managing large amounts of data. Data catalogs 144 provide a full view of each portion of data (e.g., each data record) across an enterprise and include information corresponding to, for example, the location of the data, data profiles, data summaries and data statistics. Data profiles and data summaries result from the examination of available data from data sources (e.g., databases, files, etc.) to collect statistics and/or generate informative summaries about that data. A data catalog 144 is a centralized service that facilitates discoverability and management of data sources, and may assist organizations with making informed decisions about how to use their data.

According to one or more embodiments, a data catalog 144 uses format(s) described in the data dictionary 145. The data dictionary 145 comprises a service that presents to data clients the structures (also referred to herein as "schemas") used for presenting data records to data clients or for storing data records. Schemas provide skeleton structures that represent a logical view of an entire data set, defining how the data is organized and how relationships among the data are structured. For example, a schema defines data storage and/or data client entities and the relationship among them. Schemas also formulate the constraints that are to be applied on the data, and may contain descriptive details of a database, which can be depicted by schema diagrams.

A data dictionary 145 provides detailed information about the data, such as, for example, standard definitions of data elements and allowable values of the data elements. For example, the data dictionary defines the type of data (e.g., text, numeric, date/time, unique identifiers) that may be allowable in a given field. In general, conceptual or logical entity relationship diagrams focus on high-level concepts of an enterprise. A data dictionary 145 provides more detail than entity relationship diagrams about each attribute of an enterprise concept. The data dictionary 145 provides tools that enable data and enterprise architects (e.g., administrative users 103) to communicate enterprise stakeholder requirements in such a way that developers can easily design data systems 105, databases or other data structures to meet those requirements.

The data persistence component 146 is configured to provide one or more data stores, which provide data persistence services so that data survives after cessation of the processes with which the data was created. Persistent data stores, in general, write to non-volatile storage. The data protected by the data persistence component 146 is considered durable and stable, and capable of existing across time independent of the systems that created the data. The data persistence component 146 enables repeated retrieval of the persistent data.

The operations layer 150 provides services and capabilities required by information technology operations (IT Ops) or data operations (DataOps) personnel to define and monitor how data assets are being accessed. As noted above, the data controls component 141 uses data policies 151 to grant and revoke data clients' access to data from the data systems. The data policies 151 govern data client access to data. The data policies catalog 152 is queried by the data controls component 141 to retrieve the data policies 151 for a given data client in order to determine data client access level(s). According to an embodiment, data policies 151 are in the form of data policy descriptors. A data policy descriptor comprises a collection of attributes that define: (i) policy rules that need to be enforced; (ii) the applicability of the policy rules to certain data records and/or data clients; (iii) events triggering and/or times when the policy should be enforced; (iv) compliance monitoring time intervals; and (v) compliance audit reporting templates. Additional attributes may include pointers to change management process artifacts (e.g., state of a new policy in the review and approval process). Since policies are components of the global namespace, one of the attributes in a data policy descriptor is a policy locator, which points to the location of a given policy. The format of a policy locator can follow the same dot naming convention used by the data location descriptors described above.

In one or more illustrative embodiments, the data policies 151 correspond to, for example, controls that enterprises have in place in order to meet requirements set forth by various laws and regulations (e.g., GDPR, HIPPAA, PCI DSS). Enterprise personnel (e.g., administrative users 103) may need to regularly review the current policies, editing them and add new policies, so that the enterprises can ensure they are prepared to maintain compliance with changing and new laws and regulations.

The data access monitoring component 153 reports data client access, and the data access audit component 154 generates client data access reports, which can be transmitted to administrative users 103 or data clients (via data client devices 102).

Figure 2:
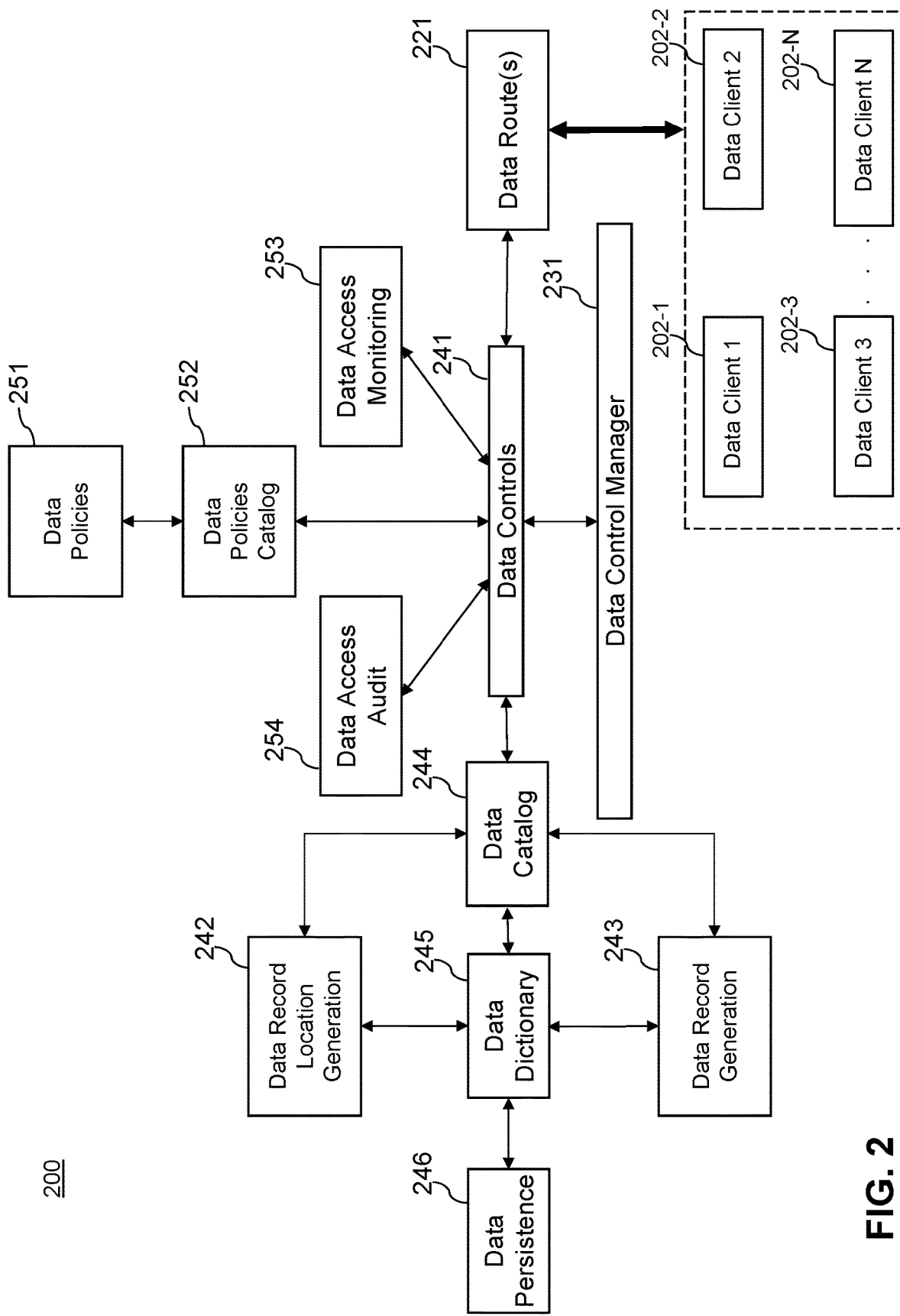
FIG. 2 is a diagram of relationships between components and services in the data control platform in an illustrative embodiment.

Referring to FIG. 2, in the relationship diagram 200, entry points for data clients 202-1, 202-2, 202-3, . . . 202-N (collectively "data clients 202") into a platform, such as data control platform 110 are data routes 221. Requests from the data clients 202 are forwarded by data routes 221 to a data controls component 241 which implements data controls to analyze and process the requests from the data clients 202. Based on the data policies 251 retrieved from the data policies catalog 252, the data controls retrieve requested data via the data catalog 244. The data controls component 241 analyzes the client requests to determine the identity of the data clients 202, and based on the data policies 251, determines whether the data clients 202 are granted or denied access to the requested data. According to an embodiment, the data policies 251 are developed by administrative users (e.g., administrative users 103). The policies are published to the data policies catalog 252 and tagged with client identifiers (ClientIDs) of data clients 202 to which the polices apply. In one or more embodiments, the data clients 202 are data accessing applications.

In accordance with an embodiment, data record location generation and data record generation components 242 and 243 generate data record location and data record descriptors for data in data systems (e.g., data systems 105) of the global namespace. The data record location generation and data record generation components 242 and 243 generate the data record location and data record descriptors based on schema information from the data dictionary 245. The data record location and data record descriptors are stored in the data catalog 244 for use in connection with retrieving the data from the data systems. The data catalog 244 generates secure access channels to the data systems (e.g. data systems 105) to retrieve the data based on the approved requests of the data clients 202.

The data persistence component 246 provides one or more data stores in the platform (e.g., platform 110) to maintain the persistence of certain portions of data (e.g., certain data records) in the platform that may be subject to persistence policies, such as, for example, data including resilience descriptors. The data stores of the data persistence component 246 may comprise non-volatile storage.

According to an embodiment, the data controls component 241 checks data access policies 251 in real time for each and every request from one of the data clients 202, which can be done without caching. As a result, policy changes (e.g., data governance changes) can be instituted in real time and take effect immediately upon generation during currently active data client sessions, when a data request is being processed. Under controls from the data controls component 241, access to the data records by the data clients 202 may be monitored, for example, by the data access monitoring component 253, and one or more reports can be generated, for example, by the data access audit component 254, regarding the monitored access to the data records by the data clients 202.

Like the control manager 131, the data control manager 231 manages configurations of data control operations generated and/or used by the data controls component 241.

Data governance is the result of the close collaboration between data descriptors, data policies, and data controls that act upon data access requests based on the data policies, data descriptors and client identities. The embodiments permit implementation of governance rules that are specific to data clients 202, data content and data location.

According to an embodiment, the above-described flow in connection with FIG. 2 is described in terms of read requests made by data clients 202. However, the embodiments are not limited thereto, and when data clients 202 make write requests to write data to data systems 105, the flow is similar except that the data controls component confirms whether the data clients 202 are enabled via one or more data policies 251 to write data to particular locations.

According to embodiments, data controls follow the data during its lifecycle to different locations and through different transformations. The embodiments provide techniques to interconnect data controls at the different locations and when the data is modified so that data may be governed from creation at a source and at different stages of development.

In accordance with one or more embodiments, data systems 105 or other data sources are analyzed to determine attributes contributing to trustworthiness and assigned a trustworthiness level. A negative change in trustworthiness level or a loss of trustworthiness attributes may be an indicator that the data source has been compromised. As a result, proper actions may be taken to disable a data source's access to the platform 110. Additionally, any data content produced after the last trustworthiness check can be quarantined.

Although a data source may have a high trustworthiness level, data that is being transmitted may be vulnerable to tampering while in transit. As such, one or more embodiments provide secure channels as data routes 121/221.

According to one or more embodiments, the data control platform 110 enables a data source (e.g., data system 105, intermediate data location or data store) to validate the trustworthiness of a data receiving endpoint, and the data receiving endpoint to validate the trustworthiness of the data source. The data receiving endpoint can include, for example, a data route 121/221 or other component of the platform or a data client 202/data client device 102. Having a two-way trust between the source of the data and the data receiving endpoint ensures that the data is being delivered to the appropriate destination and any data tampering attempts are detected. The two-way trust prevents cases where data sources are misled into sending data to hacker botnets, such as when surveillance camera feeds are routed to hacker networks. The two-way trust can be especially useful in data exchanges between IoT/Edge devices and IoT platforms.

According to one or more embodiments, the two-way trust can be established by having the data controls component 141/241 deploy a data control operation at the data collection endpoint and having that data control operation establish a trust relationship with a data control operation deployed on the data source. For example, authentication requests are transmitted between the data collection endpoint and the data source in both directions. Once the trust relationship between the two data controls is established, either one of the data controls can implement data routing decisions based on, for example, governance policies imposed on a particular class of data objects, class of data sources, and/or ad-hoc policies defined by platform administrative users 103.

According to illustrative embodiments, some aspects may be performed using artificial intelligence/machine learning. In a non-limiting example, data policies 151 may be generated using a machine learning model (e.g., linear regression, neural network, Support Vector Machine (SVM), Multilayer Perceptron (MLP), a deep learning model, decision trees and/or clustering). Such automatically generated policies can be subject to review by administrative users 103 prior to implementation in order to determine whether the automatically generated policies are correct.

The access layer 120, control layer 130, presentation and persistence layer 140, operations layer 150 and other components of the data control platform 110 comprise further hardware and software required for running the data control platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The databases, data systems or cloud environments discussed herein may comprise a database service, such as, but not necessarily limited to GCE Cloud Storage, Microsoft Azure® Blob (Binary Large Object) Storage, DynamoDB, MongoDB, Amazon Aurora® and Oracle® databases.

Although the access layer 120, control layer 130, presentation and persistence layer 140, operations layer 150 and other components of the data control platform 110 in the present embodiment are shown as part of the data control platform 110, at least a portion of the access layer 120, control layer 130, presentation and persistence layer 140, operations layer 150 and other components of the data control platform 110 in other embodiments may be implemented on one or more other processing platforms that are accessible to the data control platform 110 over one or more networks. Such components can each be implemented at least in part within another system element or at least in part utilizing one or more stand-alone components coupled to the network 104.

The databases and data systems described herein are assumed to comprise one or more storage systems configured to store information relating to processing performed, data used, and to other functionality of the data control platform 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of data control platform 110 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO®, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the data control platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks. Additionally, a processing platform is the runtime implementation of a multitude of data processing flows, including changing (or transforming) data records to meet the structure and content requirements expressed by consumers of that data (e.g. data clients).

As a more particular example, access layer 120, control layer 130, presentation and persistence layer 140, operations layer 150 and other components of the data control platform 110, and the elements thereof can each be implemented in the form of one or more LXCs running on one or more VMs. Other arrangements of one or more processing devices of a processing platform can be used to implement access layer 120, control layer 130, presentation and persistence layer 140 and operations layer 150, as well as other components of the data control platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the data control platform 110 to reside in different data centers. Numerous other distributed implementations of the data control platform 110 are possible.

Accordingly, one or each of the access layer 120, control layer 130, presentation and persistence layer 140, operations layer 150 and other components of the data control platform 110 can each be implemented in a distributed manner so as to comprise a plurality of distributed components implemented on respective ones of a plurality of compute nodes of the data control platform 110.

It is to be appreciated that these and other features of illustrative embodiments are presented by way of example only, and should not be construed as limiting in any way.

Accordingly, different numbers, types and arrangements of system components such as the access layer 120, control layer 130, presentation and persistence layer 140, operations layer 150 and other components of the data control platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the data control platform can be offered to cloud infrastructure customers or other users as part of FaaS and/or PaaS offerings.

Figure 3:
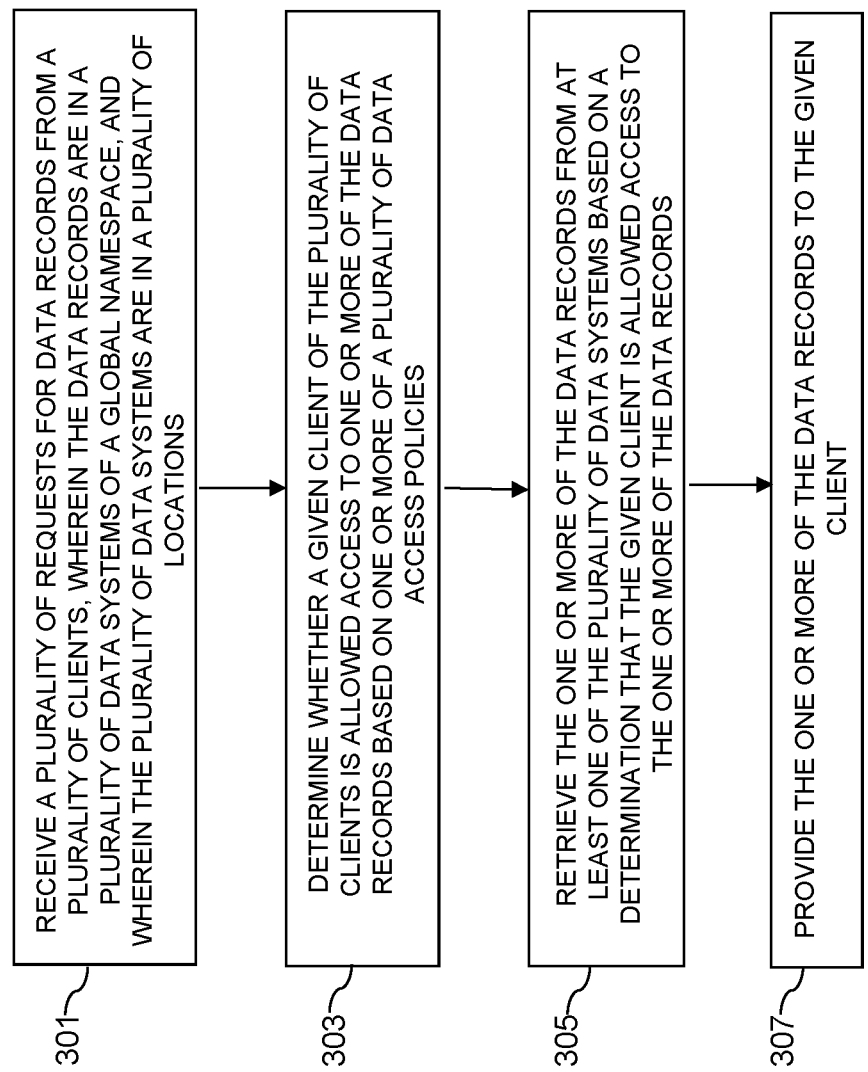
FIG. 3 is a flow diagram of a process for data governance in an illustrative embodiment.

The operation of the information processing system 100 will now be described in further detail with reference to the flow diagram of FIG. 3. With reference to FIG. 3, a process 300 for data governance as shown includes steps 301 through 307, and is suitable for use in the system 100 but is more generally applicable to other types of information processing systems comprising a data control platform configured for use in searching and managing documents.

In step 301, a plurality of requests for data records are received from a plurality of clients (e.g., data clients). The data records are in a plurality of data systems 105 of a global namespace, and the plurality of data systems 105 are in a plurality of geographic locations. In step 303, a determination is made whether a given client of the plurality of clients is allowed access to one or more of the data records based on one or more of a plurality of data access policies (e.g., policies 151). According to one or more embodiments, the data access policies 151 are dynamically generated and analyzed in real-time during active sessions with one or more of the plurality of clients.

In step 305, the one or more of the data records are retrieved from at least one of the plurality of data systems based on a determination that the given client is allowed access to the one or more of the data records. Retrieving the one or more of the data records includes determining a location of the plurality of locations for the one or more of the data records, and generating a channel to the location through which the one or more of the data records are retrieved. In step 307, the one or more of the data records are provided to the given client. According to an embodiment, a trustworthiness of a data collection endpoint of the channel is validated prior to transmission of the one or more of the data records through the channel.

According to one or more embodiments, the process further includes generating a plurality of data location descriptors identifying locations of respective data records in the global namespace, and generating a plurality of data descriptors describing one or more characteristics of respective data records. The one or more characteristics can include a version, a type, and/or a schema of the respective data records. The process can also include generating a plurality of data descriptors describing one or more operational requirements of respective data records. The operational requirements can include a resilience, a compliance constraint and/or a performance level of the respective data records.

The process also includes providing users (e.g., administrative users 103) with a plurality of schemas presenting and/or storing the data records. Access to the data records by the plurality of clients may be monitored, for example, by the data access monitoring component 153, and one or more reports can be generated, for example, by the data access audit component 154, regarding the monitored access to the data records by the plurality of clients.

In accordance with an embodiment, changes to respective portions of data (e.g., respective data records) are tracked and published to a data dictionary 145. One or more reports may be generated regarding transformations to the data records, and provided to, for example, administrative users 103. For example, updated versions of data and/or data records generated as a result of changes or modifications made to the data and/or data records are published to the data dictionary 145. Versioning is a technique by which the embodiments track data changes and/or data record changes and different content corresponding to respective portions of a data set. With versions, pieces of a data set relevant to specific data requests can be identified and retrieved without having to retrieve the whole data set, saving processing time and cost.

The process can also include replicating the data records, generating one or more snapshots of the data records and replacing the data records. Versioning is also used to define what portions of data are replicated or replaced without having to replicate or replace an entire database, saving processing time and cost.

A trustworthiness level is assigned to one or more of the plurality of data systems 105. Access to the one or more of the plurality of data systems 105 may be disabled in response to a negative change in the trustworthiness level. Data records in the one or more of the plurality of data systems produced after assignment of the trustworthiness level may be quarantined. The process can also include determining whether one or more data records have been compromised, quarantining the one or more data records that have been determined to be compromised, and recreating the one or more data records from a snapshot.

It is to be appreciated that the FIG. 3 process and other features and functionality described above can be adapted for use with other types of information systems configured to execute data control services on a data control platform or other type of processing platform.

The particular processing operations and other system functionality described in conjunction with the flow diagram of FIG. 3 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with the data control platform as disclosed herein can provide a number of significant advantages relative to conventional arrangements. For example, one or more embodiments are configured to add intelligent access controls to data nodes and data routes inside highly distributed data platforms. Depending on preconfigured policies, access control checkpoints built within the data platforms (e.g., data nodes and data routes) can grant/revoke client access to data. Additionally, the access control checkpoints can report, for example, authorized/unauthorized access, data change history and client access profiles. The access control checkpoints can also support a variety of operational tasks, such as, for example, data replication, data snapshots and data replacement.

The embodiments apply data governance controls and policies where the data resides (data at rest) or while the data is in motion (data in flight). Advantageously, the embodiments dynamically add rules to fabric nodes that define how particular types of data are accessed and by whom. This is a major departure from the current industry state-of-art architectures, which implement data governance in an ad-hoc fashion using constructs that have little or no data awareness. Implementations of the embodiments turn data governance into an integral component of a data layer (or data fabric) as opposed to being built around the data layer. With the embodiments, data governance becomes data "native." In other words, data governance is data aware (e.g., knows why data must move and where) as opposed to conventional approaches, which put coercive controls around data that preempt data moves and eventually create data silos. According to one or more embodiments, data clients do not know where the data is being stored.

Current regulatory compliance and customer privacy laws (e.g., GDPR, HIPAA, CCPA, PCI DSS) take a point-in-time perspective to data and impose rules on either data protection or data privacy or both. None of the current regulations look at data as a continuum (specifically, the data lifecycle), nor impose restrictions on data derivatives produced from transformations or by processing of data. Current access controls cannot track private data throughout its multiple transformations that make up the data's lifecycle and provide adequate protections. Even when the data does not move out of a source database, once data has gone through several transformations (e.g., data structure changes, data reductions, etc.), it is difficult to determine what constitutes private data and put the right protections in place. This gives nefarious actors opportunities to reconstruct private data content.

Additionally, under current techniques, imposing access rules on select data elements (e.g., social security number, age date of birth) leads to blockages of ever-increasing volumes of data with coercive and complex access controls. While such solutions are technically feasible, they result in extremely high operational costs. Moreover, their inherently high complexity makes the conventional approaches too difficult to operate, expand, integrate, and optimize. The situation worsens when combining multiple private and non-private data elements to generate complex business insights, and/or when multiple organizations share data sets and each organization has different data governance requirements and solutions.

Advantageously, the embodiments permit data operators (e.g., administrative users) to introduce adequate governance controls at the data level. These governance controls tag primarily private data types and have little or no impact on non-private data types. Because the embodiments enable data governance to be highly configurable, administrative users can define policies and select the data elements to which the policies are applied.

The embodiments also advantageously provide a federated governance model. The need for federated data governance models occurs when data is governed by multiple (sometimes disjointed) privacy regulations and/or responsible parties. For example, one such situation occurs when a business entity shares their data with another business entity (e.g., an emergency room sharing an itemized bill with a credit card company). The two business entities may operate in the same industry or in adjacent industries. Because privacy laws dictate that data must be protected, this situation creates the need for a federated (or multi-party) governance system to govern data. Another federated data governance situation occurs when a business entity migrates to a new governance model from an existing governance model. For some period of time (e.g., weeks, months, years) the two governance systems must coexist. The embodiments provide a data control platform capable of combining data governance practices and procedures from multiple entities in relatively cohesive fashion.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the data control platform 110 or portions thereof are illustratively implemented for use by tenants of such a multi-tenant environment.

As mentioned previously, cloud infrastructure as disclosed herein can include cloud-based systems such as AWS®, GCE and Microsoft Azure®. Virtual machines provided in such systems can be used to implement at least portions of one or more of a computer system and a data control platform in illustrative embodiments. These and other cloud-based systems in illustrative embodiments can include object stores such as AWS® S3, GCE Cloud Storage, and Microsoft Azure® Blob Storage.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
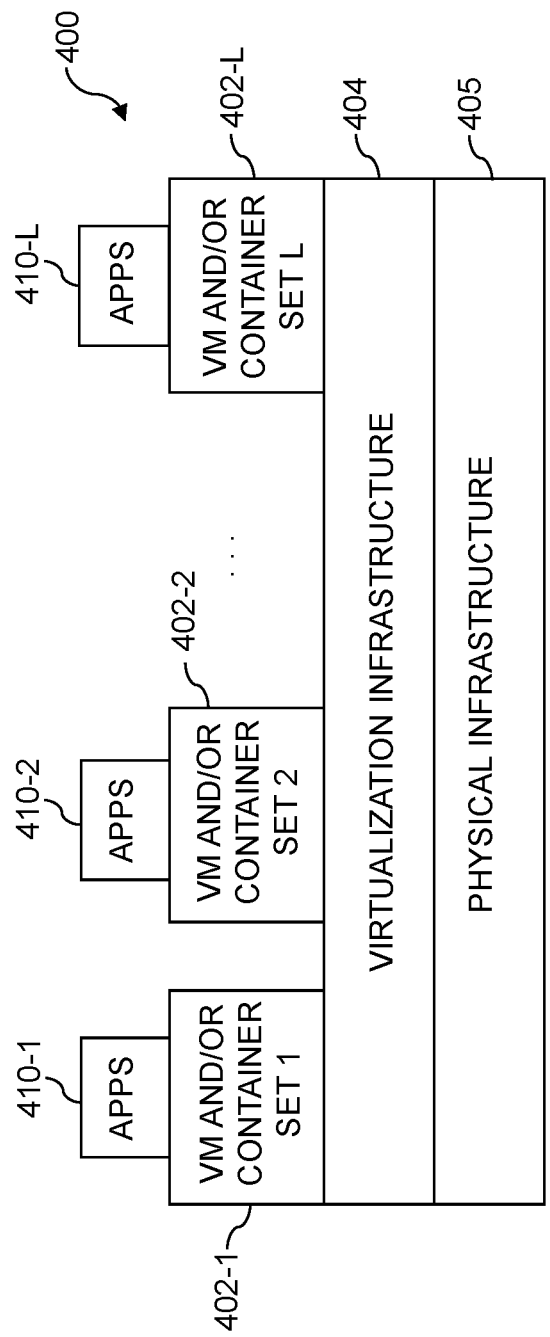
FIGS. 4 and 5 show examples of processing platforms that may be utilized to implement at least a portion of an information processing system in illustrative embodiments.
Figure 5:
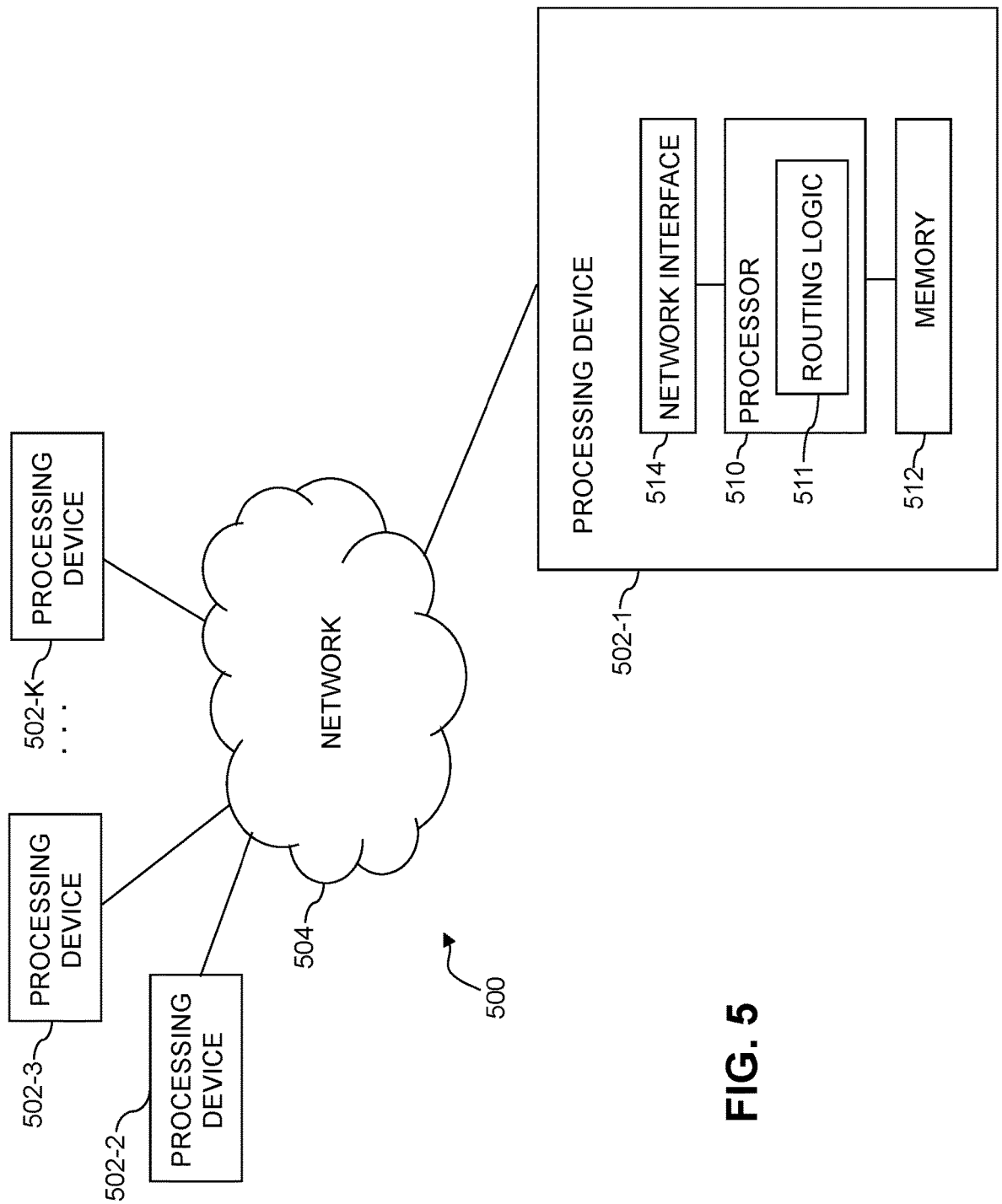

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide data control functionality of the type described above for one or more processes running on a given one of the VMs. For example, each of the VMs can implement data control for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide data control functionality of the type described above for one or more processes running on different ones of the containers. For example, a container host device supporting multiple containers of one or more container sets can implement one or more instances of data control.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512. The processor 510 may comprise a microprocessor, a microcontroller, an application-specific integrated circuit (ASIC), a field-programmable gate array (FPGA) or other type of processing circuitry, as well as portions or combinations of such circuitry elements. The processor 510 comprises routing logic 511 (e.g., routes), which determines whether network calls should be routed to another device or to a device's own applications.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the data control platform 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and data control platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to receive a plurality of requests for data records from a plurality of clients, wherein the data records are in a plurality of data systems of a global namespace, and wherein the plurality of data systems are in a plurality of locations;
to determine whether a given client of the plurality of clients is allowed access to one or more of the data records based on one or more of a plurality of data access policies;
to retrieve the one or more of the data records from at least one of the plurality of data systems based on a determination that the given client is allowed access to the one or more of the data records;
to provide the one or more of the data records to the given client; and
to generate a plurality of data descriptors describing one or more characteristics of respective data records, wherein the one or more characteristics comprise one or more schemas for structuring content of one or more of the respective data records and respective versions of the one or more schemas, the one or more schemas defining how the content is organized in the one or more of the respective data records and how relationships in the content are structured;
wherein in retrieving the one or more of the data records, said at least one processing platform is configured:
to determine a location of the plurality of locations for the one or more of the data records; and
to generate a channel to the location through which the one or more of the data records are retrieved.

2. The apparatus of claim 1 wherein said at least one processing platform is further configured to generate a plurality of data location descriptors identifying locations of respective data records in the global namespace.

3. The apparatus of claim wherein the one or more characteristics further comprise at least one of a version and a type of the respective data records.

4. The apparatus of claim 1 wherein said at least one processing platform is further configured to generate a plurality of data descriptors describing one or more operational requirements of respective data records, wherein the one or more operational requirements comprise at least one of a resilience, a compliance constraint and a performance level of the respective data records.

5. The apparatus of claim 1 wherein said at least one processing platform is further configured to provide to one or more users the one or more schemas for structuring the content of the one or more of the respective data records.

6. The apparatus of claim 1 wherein said at least one processing platform is further configured:
to monitor access to the data records by the plurality of clients; and
to generate one or more reports regarding the monitored access to the data records by the plurality of clients.

7. The apparatus of claim 1, wherein said at least one processing platform is further configured:
to track changes to respective data records; and
to publish the changes to a data dictionary.

8. The apparatus of claim 1 wherein said at least one processing platform is further configured to generate one or more reports regarding transformations to the data records.

9. The apparatus of claim 1 wherein said at least one processing platform is further configured to at least one of replicate the data records, generate one or more snapshots of the data records and replace the data records.

10. The apparatus of claim 1 wherein the one or more of the plurality of data access policies are dynamically generated and analyzed in real-time during active sessions with one or more of the plurality of clients.

11. The apparatus of claim 1 wherein said at least one processing platform is further configured:
to assign a trustworthiness level to one or more of the plurality of data systems; and
to disable access to the one or more of the plurality of data systems in response to a negative change in the trustworthiness level.

12. The apparatus of claim 1 wherein said at least one processing platform is further configured:
to assign a trustworthiness level to one or more of the plurality of data systems; and
to quarantine data records in the one or more of the plurality of data systems produced after assignment of the trustworthiness level.

13. The apparatus of claim 1 wherein said at least one processing platform is further configured:
to determine whether given ones of the data records have been compromised;
to quarantine the given ones of the data records that have been determined to be compromised; and
to recreate the given ones of the data records from a snapshot.

14. The apparatus of claim 1 wherein said at least one processing platform is further configured to validate a trustworthiness of a data collection endpoint of the channel prior to transmission of the one or more of the data records through the channel.

15. A method comprising:
receiving a plurality of requests for data records from a plurality of clients, wherein the data records are in a plurality of data systems of a global namespace, and wherein the plurality of data systems are in a plurality of locations;
determining whether a given client of the plurality of clients is allowed access to one or more of the data records based on one or more of a plurality of data access policies;
retrieving the one or more of the data records from at least one of the plurality of data systems based on a determination that the given client is allowed access to the one or more of the data records;
providing the one or more of the data records to the given client; and
generating a plurality of data descriptors describing one or more characteristics of respective data records, wherein the one or more characteristics comprise one or more schemas for structuring content of one or more of the respective data records and respective versions of the one or more schemas, the one or more schemas defining how the content is organized in the one or more of the respective data records and how relationships in the content are structured;
wherein retrieving the one or more of the data records comprises:
determining a location of the plurality of locations for the one or more of the data records; and
generating a channel to the location through which the one or more of the data records are retrieved;
wherein the method is performed by at least one processing platform comprising at least one processing device comprising a processor coupled to a memory.

16. The method of claim 15 further comprising:
assigning a trustworthiness level to one or more of the plurality of data systems; and
disabling access to the one or more of the plurality of data systems in response to a negative change in the trustworthiness level.

17. The method of claim 15 further comprising:
assigning a trustworthiness level to one or more of the plurality of data systems; and
quarantining data records in the one or more of the plurality of data systems produced after assignment of the trustworthiness level.

18. The method of claim 15 further comprising validating a trustworthiness of a data collection endpoint of the channel prior to transmission of the one or more of the data records through the channel.

19. A computer program product comprising a non-transitory processor-readable storage medium having stored therein program code of one or more software programs, wherein the program code when executed by at least one processing platform causes said at least one processing platform:
to receive a plurality of requests for data records from a plurality of clients, wherein the data records are in a plurality of data systems of a global namespace, and wherein the plurality of data systems are in a plurality of locations;
to determine whether a given client of the plurality of clients is allowed access to one or more of the data records based on one or more of a plurality of data access policies;
to retrieve the one or more of the data records from at least one of the plurality of data systems based on a determination that the given client is allowed access to the one or more of the data records;
to provide the one or more of the data records to the given client; and
to generate a plurality of data descriptors describing one or more characteristics of respective data records, wherein the one or more characteristics comprise one or more schemas for structuring content of one or more of the respective data records and respective versions of the one or more schemas, the one or more schemas defining how the content is organized in the one or more of the respective data records and how relationships in the content are structured;

wherein in retrieving the one or more of the data records, said at least one processing platform is configured:
  to determine a location of the plurality of locations for the one or more of the data records; and
  to generate a channel to the location through which the one or more of the data records are retrieved.

20. The computer program product according to claim 19, wherein the program code further causes said at least one processing platform:
  to assign a trustworthiness level to one or more of the plurality of data systems; and
  to quarantine data records in the one or more of the plurality of data systems produced after assignment of the trustworthiness level.

\* \* \* \* \*

UNITED STATES PATENT AND TRADEMARK OFFICE
CERTIFICATE OF CORRECTION

PATENT NO. : 11,388,168 B2
APPLICATION NO. : 16/785770
DATED : July 12, 2022
INVENTOR(S) : Aurelian Dumitru et al.

Page 1 of 1

It is certified that error appears in the above-identified patent and that said Letters Patent is hereby corrected as shown below:

In the Claims

Claim 3, Column 18, Line 58, please delete "apparatus of claim wherein" and insert therefor --apparatus of claim 1 wherein--

Signed and Sealed this
Ninth Day of August, 2022

Katherine Kelly Vidal
*Director of the United States Patent and Trademark Office*